Sept. 24, 1940.  J. H. BUCKNAM ET AL  2,215,576
CONTROL SYSTEM FOR HARDENING AND SIMILAR OPERATIONS
Filed May 23, 1936  3 Sheets-Sheet 1
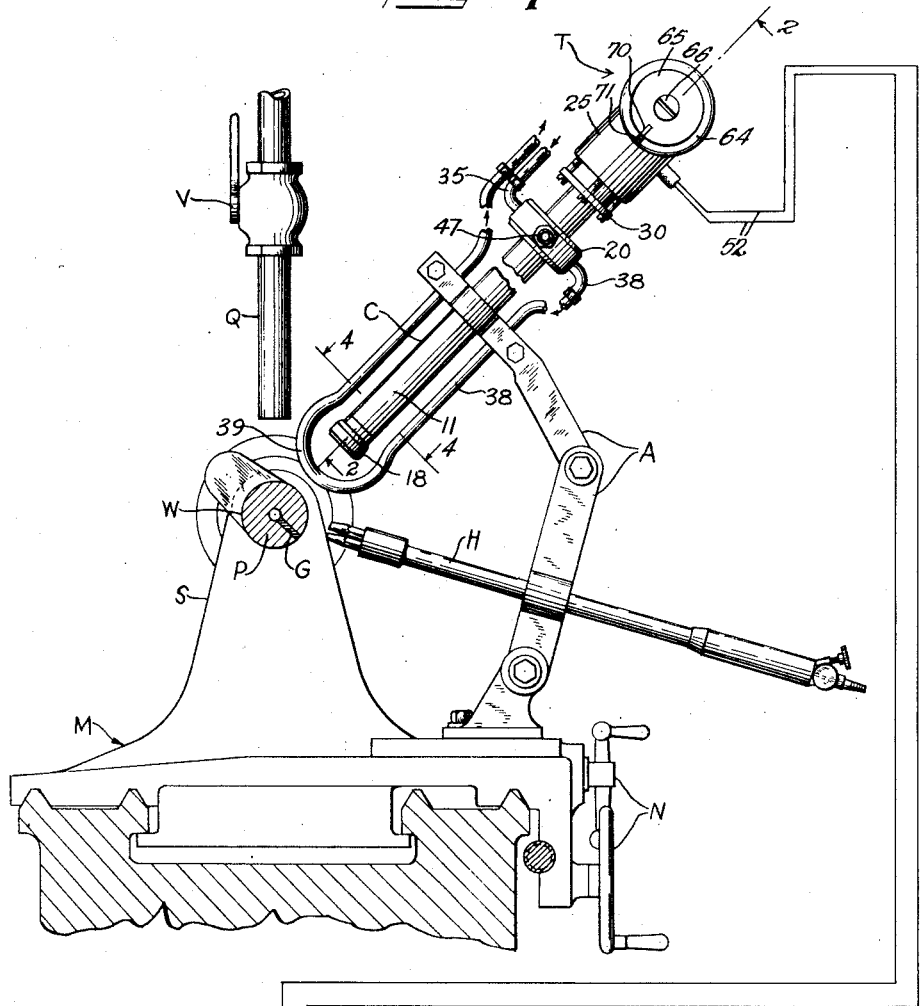
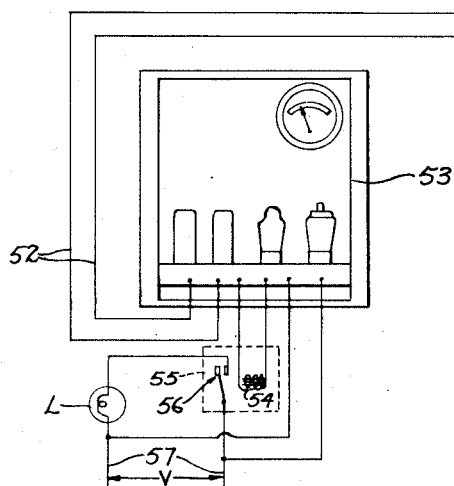
INVENTORS
JAMES H. BUCKNAM
LLOYD W. YOUNG
BY
*Ed Greenewald*
ATTORNEY

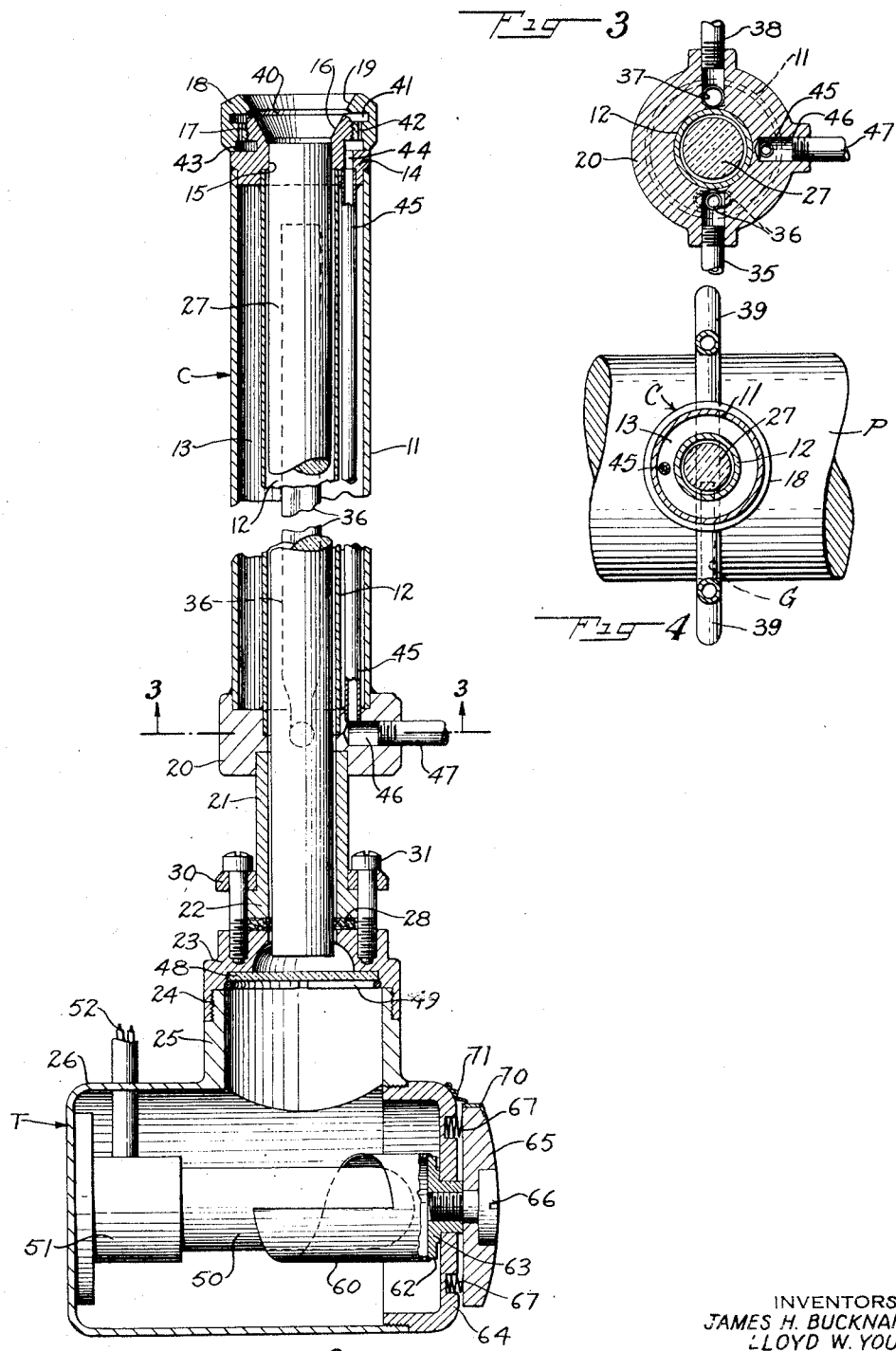

Patented Sept. 24, 1940

2,215,576

UNITED STATES PATENT OFFICE 2,215,576

CONTROL SYSTEM FOR HARDENING AND SIMILAR OPERATIONS

James H. Bucknam, Cranford, and Lloyd W. Young, Scotch Plains, N. J., assignors to The Linde Air Products Company, a corporation of Ohio Application May 23, 1936, Serial No. 81,386

10 Claims. (Cl. 266—4)

This invention relates to systems for controlling, measuring, or indicating temperatures, and more particularly to a system for indicating and controlling the temperature of a metal body while it is being heat-treated.

In the localized heat-treatment of metals, such as iron and steel, it is always desirable to obtain uniform results in the treated product. Heretofore, when hardening, carbonizing, and annealing such metal bodies, it has generally been the practice for the operator to determine visually when the heated body has reached the proper temperature. Obviously, such a practice tends to introduce considerable error in the desired treatment of the metal, and render the production of uniform results difficult.

Therefore, it is one of the principal objects of the present invention to provide a system for controlling, measuring and indicating temperatures of heated metal bodies which will respond rapidly to temperature changes and aid in overcoming the above-mentioned difficulties. Other objects are: to provide a simplified instrument for indicating high temperatures of either stationary or moving objects of metal; to provide means for cooling and for maintaining in a clean condition portions of the instruments which come adjacent to the high temperature source; and to provide means for adjusting and calibrating the instrument.

A more detailed disclosure of the objects and novel features of the invention will be found in the following description and in the accompanying drawings in which:

Fig. 1 is a diagrammatic view of one form of heat-treating apparatus with which this invention may be employed, wherein the heating and quenching means and the temperature indicator are approximately coplanar with the plane of section through the work.

Fig. 2 is a longitudinal sectional view of the temperature indicator taken along line 2—2 of Fig. 1.

Fig. 3 is a transverse sectional view of the indicator shown in Fig. 2, the view being taken substantially along the line 3—3 of Fig. 2;

Fig. 4 is a transverse sectional view of the temperature indicator taken along the line 4—4 of Fig. 1.

Figure 5:
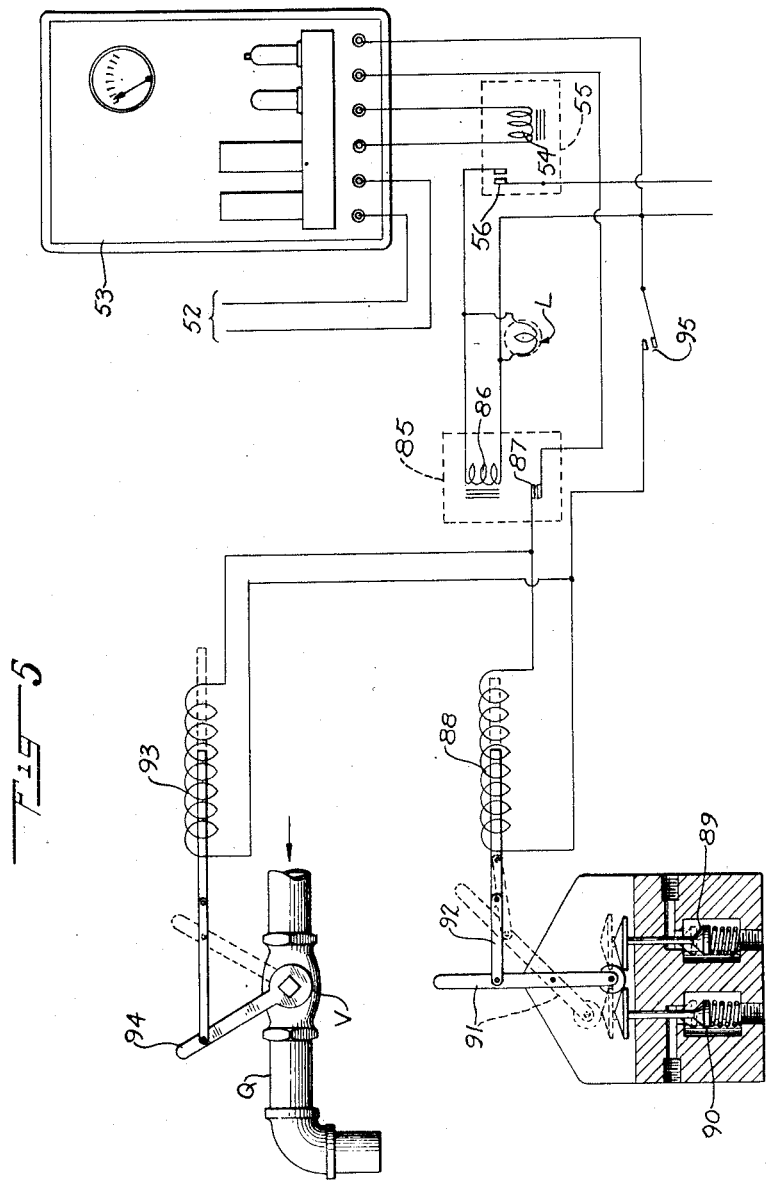
Fig. 5 is a diagrammatic view of a control mechanism which is adapted to be used in conjunction with the apparatus shown in Fig. 1.

As shown in Fig. 1, one form of temperature indicator T embodying this invention may comprise a light transmitting or conveyor tube C, one end of which is adapted to be positioned adjacent the source of radiant energy, such as, for example, a metal body W undergoing heat-treatment. Radiant energy emitted from the body enters the tube at the forward end thereof, and is transmitted, preferably through a quartz rod or other suitable light-conducting medium, to an energy responsive means, such as a photoelectric cell, at the opposite end of the tube or housing. When the radiations reach a predetermined magnitude, the photocell responses, which may be amplified, actuate a suitable signal or control, such as the light L, to notify an attendant that the predetermined temperature has been reached, whereupon he may remove the source of heat and proceed to conduct the proper heat-treatment. A screen may be interposed between the photocell and the source of radiant energy to control the response of said photocell. To keep the exposed surface of the light-conducting medium in a clean condition, and to prevent the accumulation of foreign material thereon, an annular converging blast of air may be arranged to issue from the forward end of the tube.

The principles of the invention have been shown, in the present instance, applied to an apparatus particularly adapted for use in surface hardening cylindrical metal objects. Thus, a lathe or machine M having a tail stock S and carriage positioning members N is shown serving as a support for rotatably mounting thereon an article to be hardened, such as, for example, a crankshaft W. The crankshaft W is suitably mounted in the lathe so that it may be rotated about the axis of a pin P of the crankshaft, exposed to the action of an oxy-acetylene blowpipe H or other suitable source of high temperature heat. When the circumferential surface of the crankshaft pin P reaches the desired predetermined temperature, the signal light L will be operated automatically to indicate to the attendant that the blowpipe should be extinguished. The blowpipe H and the temperature indicator T, which are adjustably mounted on suitable articulated arms A secured to the lathe, may then be swung to an inoperative position. Quenching fluid, which for the heat-treatment of crankshafts may preferably be a sodium hydroxide solution, is then admitted through a pipe Q controlled by a valve V located directly above the article being treated. Ordinarily, the crankshaft pins are provided with oil holes, and to prevent the quenching fluid from entering said holes, they may be filled with carbon or graphite plugs G, which are easily removed when the heat-treatment is completed.

Having thus generally described an apparatus for the heat-treatment of crankshaft pins with which the temperature indicator embodying the principles of the present invention may be advantageously employed, said temperature indicator will now be described in detail.

Referring to Fig. 2, a preferred form of temperature indicator T, and particularly the light conveyor tube C thereof, comprises an outer tube or housing 11 and an inner concentrically mounted cylindrical tube 12, an annular space 13 being provided between these two tubes. The front end of each of the tubes 11 and 12 is suitably secured and sealed in a bushing or tip member 14 having an inner bore 15 which is substantially flush with the inner surface of the tube 12 at its rearward end, and diverges or flares outwardly at its front end to form a conical surface 16. Threads 17 are provided on the outside surface of the member 14 for the reception of an outer annular cap 18. This cap 18 is also provided with an inner conical surface 19 which aligns with the surface 16 of the bushing 14, and the two aligned conical surfaces constitute an entrance for radiant energy. The rear ends of the tubes 11 and 12 are likewise secured and sealed in a ring or cylindrical mounting block 20, the inner surface of which is substantially flush with the inner surface of the tube 12. Extending rearwardly from the mounting block 20, as the parts are shown in Fig. 2, is a sleeve 21 having a flange 22 which serves to connect the above-described tube or housing structure with an apertured cap 23 which is threaded at 24 to a cylindrical branch 25 of a photocell housing 26.

For the purpose of efficiently conducting radiant energy from the conical-shaped entrance 16—19 into the photocell housing 26, there is provided a quartz rod 27 or other suitable light-conducting medium, which is mounted within the tube 12 and sleeve 21 and extends substantially throughout the length thereof. This quartz rod 27 is of such diameter as to fit tightly within the cylindrical portion 15 of the inner bushing member 14. Between the flange 22 and the cap 23, there is provided a resilient annular gasket 28, the inner edge of which tightly grips the inner end of the quartz rod 27 to prevent movement of the latter, and also to provide a tight connection between the sleeve 21 and the cap 23. The gasket 28 is compressed and urged inwardly into tight gripping relation with the quartz rod 27 by a clamping collar 30, which encircles the sleeve 21 and is pressed against the flange 22 by bolts 31 passing through said collar and into tapped openings in the cap 23.

When the temperature indicator T is mounted in its operative position, as shown in Fig. 1, the whole device, and particularly the light entrance end thereof, is in close proximity to the heated body. Consequently, the temperature indicator itself becomes quite hot, and it is therefore desirable to make some provision for cooling at least the forward end of the instrument. One method by which this may be accomplished is shown in Figs. 2 and 3, wherein a water inlet pipe 35 is threaded in a port provided in the mounting block 20 and leads to a water-tube or conduit 36 which extends forwardly into the annular space 13, as shown in dotted lines in Fig. 2. The tube 36, which is preferably flattened to elliptical cross-section, terminates a short distance behind the inner cap member 14 so that water or other cooling fluid flowing therethrough may empty into and fill the entire annular space 13, thereby providing a cooling jacket around the inner tube 12.

An outlet port 37, connecting with a discharge pipe 38, may be provided opposite the inlet port 35 in the mounting block 20. In Fig. 1, the discharge pipe 38 is shown extending the entire length of the housing 11 toward the front thereof, where it is looped at 39 around the end thereof, and from whence it extends back to a suitable point of discharge. Aside from effectively cooling the front end of the light conveyor tube C, the looped portion 39 may be positioned directly opposite and substantially in the plane of the carbon plug G in the crankpin to serve as a shield, preventing the glare from the heated carbon from reaching the photoelectric cell and causing any false operation thereof.

When the quenching fluid impinges on the surface of the hot work, the fluid is partially vaporized, atomized portions being sprayed outwardly over the adjacent apparatus and becoming suspended in the atmosphere. Even though the temperature indicator T and blow-pipe H are shifted from the heated metal prior to the quenching operation, there is a tendency for salts and other foreign material in the hot quenching fluid to deposit on the cap 18 and particularly the flared entrance surfaces and the end of the quartz rod 27. The accumulation of such foreign material would tend to minimize the amount of light transmitted by the quartz rod, and cause a false operation or otherwise seriously affect the normal operation of the apparatus. To guard against this tendency, means may be provided to discharge a blast of air across the front ends of these parts. To this end, the cap 18 and the bushing 14 are so constructed as to provide an annular outlet orifice 40 which is inclined rearwardly and outwardly into communication with an annular chamber 41 as shown in Fig. 2. Spaced ports 42 connect the chamber 41 with an annular manifold 43 which is formed in the bushing 14 and sealed when the upper cap 18 is mounted thereon. As shown in Fig. 2, a larger port 44 provided in the bushing 14 establishes fluid communication between the manifold 43 and an air supply pipe 45 which extends rearwardly through the annular space 13 to an air inlet port 46 provided in the mounting block 20. Air under pressure is supplied to the port 46 by means of a supply pipe 47 and thence passes through the above-described system and out of the orifice 40 in the form of an annular converging jet or blast having the shape of a hollow cone. This blast of air, which is used particularly during the quenching operation, prevents the penetration of any foreign material and maintains the entrance of the device and the end of the quartz rod in a clean condition. The air blast also aids in preventing the hot mixture of burning and partially burned gases, rising from the adjacent blowpipe H, from entering the zone immediately in front of the light conveyor tube C where the flames would be liable to cause a false operation of the apparatus.

Thus, when the temperature indicator T is in use, the light conveyor tube C may be maintained in a substantially cool condition; the end of the quartz rod may be kept free from any foreign matter in the quenching solution; and light or radiant energy from the heated body may be transmitted or conveyed through said quartz rod and into the branch 25 of the photocell housing.

By providing the looped portion 39 adjacent the crankpin undergoing treatment, any glare from the carbon plug G will not pass to the quartz rod 27, and the radiant energy reaching the photocell housing will be representative of the temperature of the heated body. However, if a salt solution, or a sodium hydroxide solution, is used for quenching, the metal may become coated with such compound. When sodium compounds are exposed to the heating blowpipe, a highly luminous yellow flame is produced, and unless precautions are taken, the signal may be operated prematurely. To guard against any false operation of the signal and to compensate for the increased luminosity of the metal undergoing treatment, a filter may be interposed between the flame and the photocell. In the present construction, as shown in Fig. 2, a filter 48 is secured across the entrance of the branch 25 of the photocell housing and adjacent the inner end of the quartz rod 27. This filter, which for sodium salts may be didymium glass to absorb the characteristic band of sodium light, is removably held in position by a split spring-retaining ring 49 engaging in an annular groove provided in the cap 23.

Light or radiant energy passing the filter 48, has all the extraneous radiant energy removed therefrom, is representative of the temperature of the heated metal, and is in proper condition to energize a photoelectric cell 50 or other suitable device which is responsive to radiant energy and directly in its path. This photoelectric cell is mounted in a suitable socket or base 51 which is secured to one end of the housing 26, the axis of the photocell preferably being perpendicular to the axis of the branch 25. Electrical responses from the photocell are conducted by suitable wires 52 to a suitable amplifier 53, as shown in Fig. 1. The output of the amplifier serves to energize a coil 54 of a relay 55 so that, when the current is sufficient, the contacts 56 of said relay will be closed. Closing of the contacts 56 will effect an operation of the lamp L, or other suitable control device, the entire circuit being connected to a suitable source of current through the conductors 57.

Since the response of the photocell 50 is a function of the area thereof which is exposed to the radiant energy, it is possible with a given intensity of radiant energy to vary the responsiveness of said photocell by means of a suitable screen or shield 60. As shown in Fig. 2, a preferred form of screen comprises a cylinder or generally tubular member of substantially opaque material partially surrounding the right hand end of the photocell 50 and having the left hand edge thereof cut away in the form of a helix. The screen 60 is secured in any suitable manner to a flange 62 provided on the end of a boss 63 which is journaled in the right hand end 64 of the photocell housing 26, which end 64 is in the form of a cap threaded to the main body portion of the photocell housing. A dial 65 is mounted on the outer end of the boss 63 by means of a headed screw 66 and is spaced from the outer surface of the cap 64 to prevent an excessive amount of friction between these two surfaces. However, in order to provide the required friction to hold the dial 65 and its associated screen 60 resiliently in any adjusted position, a plurality of compression springs 67 may be inserted between the dial and cap 64 in suitable recesses provided in said cap. Preferably, the dial 65 is provided with a series of radial graduations, which may consist of a series of equally spaced indentations 70 on the face and edge thereof, having a numerical scale and cooperating with an index 71 on the cap 64. By raising a metal body to a known temperature, which may be measured with a radiation pyrometer or in any other conventional manner, and then turning the dial 65 until the signal lamp L is lighted, the said dial 65 may be calibrated in terms of temperature.

In using the above-described temperature indicator in conjunction with the heat-treatment of crankshaft pins P, the light conveyor tube C thereof is directed downwardly towards the pin P by adjustment of the articulated arms A, as shown in Fig. 1. The light conveyor tube is positioned longitudinally of the pin to a point where the loop 39 of the water-cooled opaque tubing or pipe 38 will be in direct alignment with the carbon plug G to thereby act as a shield preventing any glare from the heated carbon from reaching the photocell. Rotation of the crankshaft is effected through the lathe M, and during rotation high temperature heat is applied by the blowpipe H to the pin being treated. The dial 65 for adjusting the screen of the photoelectric cell has been properly calibrated beforehand and is set to the desired quenching temperature before the heat is applied. Hence, when the shaftpin P reaches the proper temperature, the radiant energy emanating therefrom will enter the light conveyor tube which is directed thereupon, and pass through the quartz rod 27 and into the photoelectric cell housing. As has been pointed out heretofore, the radiant energy before reaching the photoelectric cell 50 preferably passes through the filter 48 so that any undesired radiation from the highly luminous yellow flame, produced by exposure of sodium compounds to the heating blowpipe, will be removed. Thus the radiant energy reaching the photoelectric cell 50 is representative of the actual temperature of the metal undergoing treatment; and when the predetermined temperature has been reached the current passed by the photocell will be sufficient, when amplified in the amplifier 53, to effect a closing of the relay contact 56 to light the signal lamp L. The lighting of the lamp indicates to the attendant that the proper and predetermined temperature has been reached, whereupon the entire temperature indicator and the heating blowpipe may be moved away from the crankshaft and the quenching liquid or cooling medium applied thereto by means of the valve V.

In Fig. 5 there is shown additional control mechanism which may be used in conjunction with the above-described apparatus shown in Fig. 1, and by means of which the high temperature heat may be instantly and automatically shut off and the valve for the quenching medium simultaneously opened when the work has been heated to a predetermined temperature. Such mechanism may comprise an additional large power relay 85 which is connected in circuit with and controlled by the relay 55 and which includes a coil 86 and contacts 87. A solenoid 88 is provided in the circuit to control spring-pressed valves 89 and 90 for the oxygen and acetylene respectively, said valves being held open by a pivotally mounted operating arm or handle 91 which is connected by a link 92 to the core or plunger of the solenoid. The construction and arrangement of this mechanism is such that when the arm is in a vertical position both valves 89 and 90 will be held open, but upon energization of the solenoid 88 the arm 91 will be moved to the dotted-line position shown in Fig. 5 to cause the oxygen valve 89 to close first and then allow the acetylene valve 90 to close. Likewise, another solenoid 93 may be provided in the circuit with the power relay 85, which solenoid has the plunger thereof connected to an arm or handle 94 for controlling the valve V for the quenching medium. This valve is normally closed but is adapted to be opened by moving the handle 94 to the dotted-line position upon energization of the solenoid 93. It is desirable to provide a switch 95 in circuit with the two solenoids so that tests may be made on the control unit without opening or closing the gas control valves 89 and 90 or the quenching valve V.

Thus, as hereinbefore pointed out, an increase in radiant energy, or light falling upon the photoelectric cell 50 will cause an increase in the current flowing in coil 54 of relay 55. When the temperature of the crankshaft has been raised to the predetermined value the contacts 56 will close, which may light the signal lamp L and energize the coil of the power relay 85. Such energization will effect a closing of the contacts 87 and, if the switch 95 is closed, current will flow through the solenoids 88 and 93 and thereby automatically shut off the gas supply and open the quenching valve.

It will be understood that the solenoid 88 may be utilized to open an electric switch controlling the circuit of a heat-treating electric arc that may be used in place of the blowpipe flame; or that electric motors may be used in place of the solenoids. Various other changes may be made in the herein-disclosed construction, and certain features thereof may be employed without others, without departing from the principles of the present invention or sacrificing any of its advantages.

What is claimed is:

1. In apparatus of the character described in which means is provided for heating the work, the combination of means located at a point away from the work and responsive to radiant energy emitted by the heated work for indicating when the work is heated to a predetermined temperature, a tube for transmitting radiant energy from said heated work to said energy responsive means, an opaque, water-cooled shield positioned between the heated work and the tube entrance to screen from said energy responsive means such portions of said work as are in a markedly different degree of incandescence than the remainder of said work, and means for projecting an annular air blast from the end of said tube adjacent to said work.

2. In apparatus of the character described in which means is provided for progressively heating the work, the combination of means located at a point away from the work and responsive to radiant energy emitted by the heated work for indicating when the work is heated to a predetermined temperature, and means for transmitting radiant energy from said heated work to said energy responsive means, said radiant energy transmitting means comprising a quartz rod extending between the work and said energy responsive means, and means for ejecting an annular converging fluid blast adjacent to the end of said rod nearest said work for preventing foreign material from accumulating thereon.

3. In apparatus of the character described in which means is provided for progressively heating the work, the combination of means responsive to radiant energy emitted by the heated work for controlling the temperature to which the work will be heated; a tube for conveying radiant energy from said body to said energy responsive means; and a loop of water-cooled opaque tubing extending between the heated work and the entrance of said tube, to screen out portions of the heated work.

4. In combination, means for applying high temperature heat to the surface of metal work; means for rotating such work relatively to such heat-applying means to uniformly heat a portion of the surface of such work to a predetermined temperature, at which temperature such surface portion emits radiant energy of a substantially definite intensity; a source of quenching medium; a radiant energy sensitive device responsive to such intensity of radiant energy emission; a tube for conveying said radiant energy from said source to said device; means actuated by said device for applying quenching medium from said source to said rotating work when the work has become heated to such predetermined temperature; and means for projecting an annular blast of air converging from the entrance of said tube to deflect said quenching medium from the entrance of said tube.

5. Apparatus for varying the responsiveness of a photoelectric cell to a given intensity of radiant energy comprising a housing adapted to receive a photoelectric cell, said housing being provided with an entrance through which radiant energy may pass from a radiant energy source to said photoelectric cell; and a shield for varying the amount of the area of said photoelectric cell exposed to the radiant energy admitted through said entrance to thereby vary the responsiveness of said cell, comprising a generally tubular substantially opaque member at least partially surrounding said cell and being interposed between said cell and such source of radiant energy, said member being provided with a generally helical edge and being movable to a number of predetermined positions to expose different amounts of the total area of said photoelectric cell to said radiant energy, whereby said apparatus renders said cell most responsive when said member exposes substantially all of said area, and renders said cell least responsive when said member exposes substantially none of said area.

6. The combination with a photoelectric cell, of a radiant-energy transmitting tube operatively associated therewith, and means for discharging an annular converging air blast from the entrance of said tube.

7. The combination with a photoelectric cell of a radiant-energy transmitting means operatively associated therewith and comprising, an elongated tube, and a member mounted on the forward end of said tube and having an annular orifice therein; and means for discharging a converging air blast from said orifice.

8. In apparatus of the character described in which means is provided for heating metal work, the combination of a signal device; a photoelectric cell for controlling said signal device to indicate when the work is heated to a predetermined temperature; means, including an elongated quartz member extending between the heated work and said photoelectric cell, for transmitting radiant energy from said work to said photoelectric cell; means for cooling such energy-transmitting means; means for varying the temperature at which said signal device will be operated, such temperature varying means comprising an opaque cylindrical screen partially surrounding said photoelectric cell and having a generally helical outer edge, and means secured to said screen for rotating said screen to thereby vary the area of said photocell exposed to said radiant energy admitted to the photoelectric cell; and means comprising an opaque shield, between said work and said quartz member, to screen out portions of the work for preventing premature operation of said signal device.

9. Apparatus for heat treating a surface of a ferrous metal body comprising, in combination, means for applying high temperature heat to said surface; means for projecting a cooling liquid against a portion of said surface when heated to a predetermined temperature; means for indicating when the portion of said surface to be treated has been heated to such predetermined temperature, such indicating means comprising means responsive to radiant energy emitted by such heated surface portion, a device for conveying radiant energy to such responsive means and having a part thereof disposed adjacent such heated surface portion; and means for delivering a gas blast from an annular orifice in said part across the space between said part and such adjacent surface portion to exclude cooling liquid from said part of said device.

10. Apparatus for heat treating a portion of the surface of a steel shaft while the latter is rotating, such apparatus comprising, in combination, means for applying localized high temperature heat to such surface portion to heat the same; means for projecting a stream of cooling liquid against said surface portion after the same has been heated to a predetermined temperature; and means for indicating when said surface portion has been heated to such predetermined temperature, such indicating means comprising a photo-electric cell responsive to radiant energy emitted by the heated surface portion, a device for conveying radiant energy from said heated surface portion toward said photo-electric cell and having an end thereof disposed adjacent to but spaced from the rotating shaft; and means for discharging an annular converging air blast across the space between said shaft and said end of said device to exclude cooling liquid from said end of said device.

JAMES H. BUCKNAM.
LLOYD W. YOUNG.